(12) United States Patent
Li et al.

(10) Patent No.: US 7,818,560 B2
(45) Date of Patent: Oct. 19, 2010

(54) SYSTEM INFORMATION SYNCHRONIZATION IN A LINKS-BASED MULTI-PROCESSOR SYSTEM

(75) Inventors: Yufu Li, Shanghai (CN); XiaoHua Cai, Shanghai (CN); Rahul Khanna, Portland, OR (US); Murugasamy Nachimuthu, Hillsboro, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 11/859,640

(22) Filed: Sep. 21, 2007

(65) Prior Publication Data

US 2009/0083528 A1    Mar. 26, 2009

(51) Int. Cl.
*G06F 15/177* (2006.01)
(52) U.S. Cl. .............................. 713/2; 709/211; 711/121

(58) Field of Classification Search ................. 709/211; 711/121; 713/1, 2
See application file for complete search history.

(56) References Cited

U.S. PATENT DOCUMENTS

| | | | |
|---|---|---|---|
| 7,254,676 B2 * | 8/2007 | Datta et al. ................. | 711/118 |
| 7,469,335 B2 * | 12/2008 | Chu et al. ...................... | 713/2 |
| 7,600,109 B2 * | 10/2009 | Ueltschey et al. .............. | 713/2 |
| 2005/0172113 A1 * | 8/2005 | Lee ............................... | 713/2 |

* cited by examiner

*Primary Examiner*—Albert Wang
(74) *Attorney, Agent, or Firm*—Schwegman, Lundberg & Woessner, P.A.

(57) ABSTRACT

Various embodiments described herein include one or more of systems, methods, firmware, and software to synchronize system information between processors during system boot in a links-based multi-processor system. Some embodiments synchronize data block by block through memory rather than piece by piece through registers by allowing a System Bootstrap Processor ("SBSP") to directly access synchronization data in local memory of each of one or more Application Processors. These and other embodiments are described in greater detail below.

15 Claims, 4 Drawing Sheets

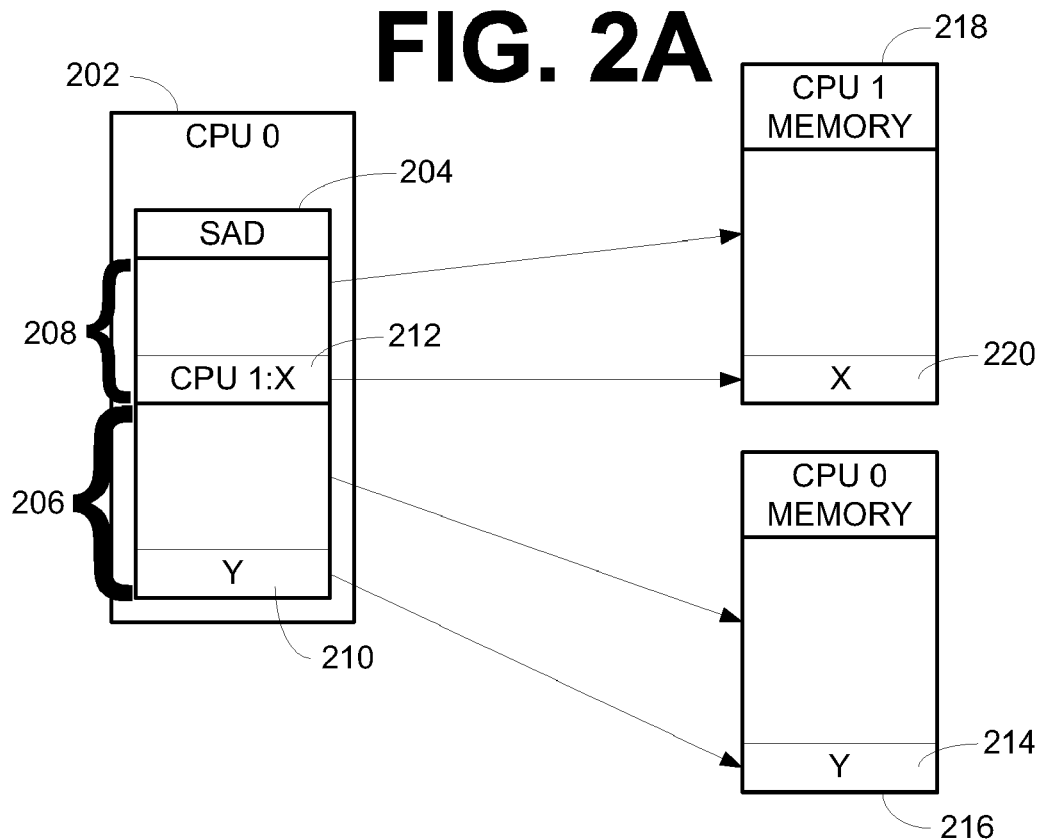
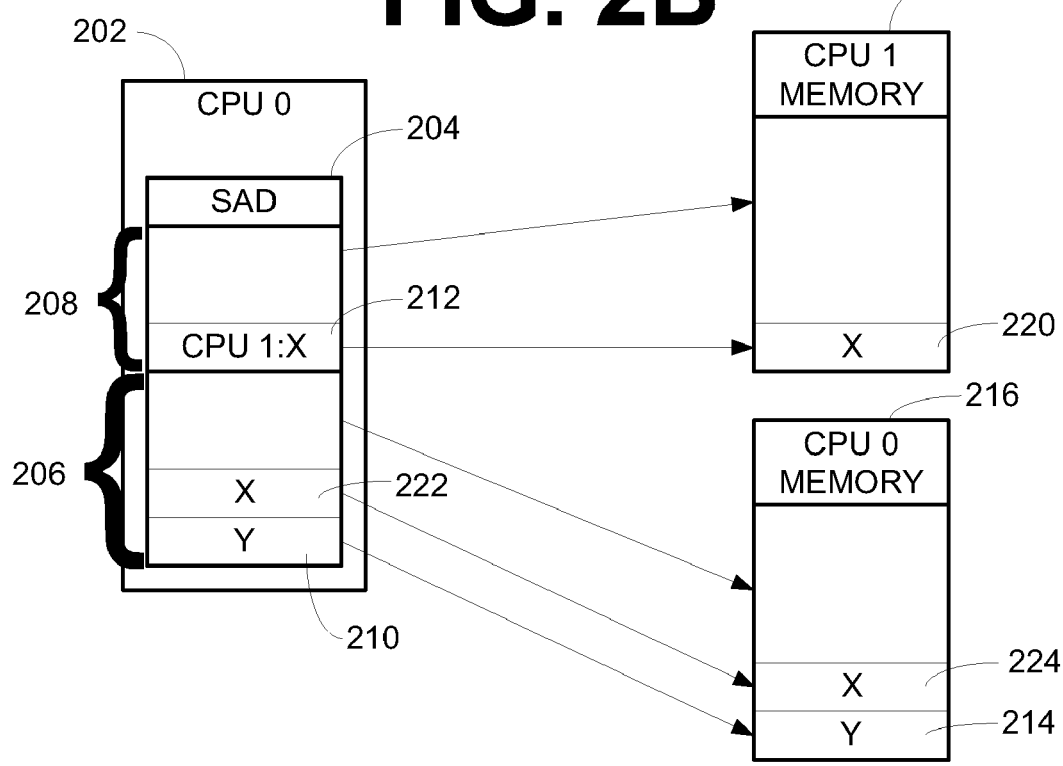

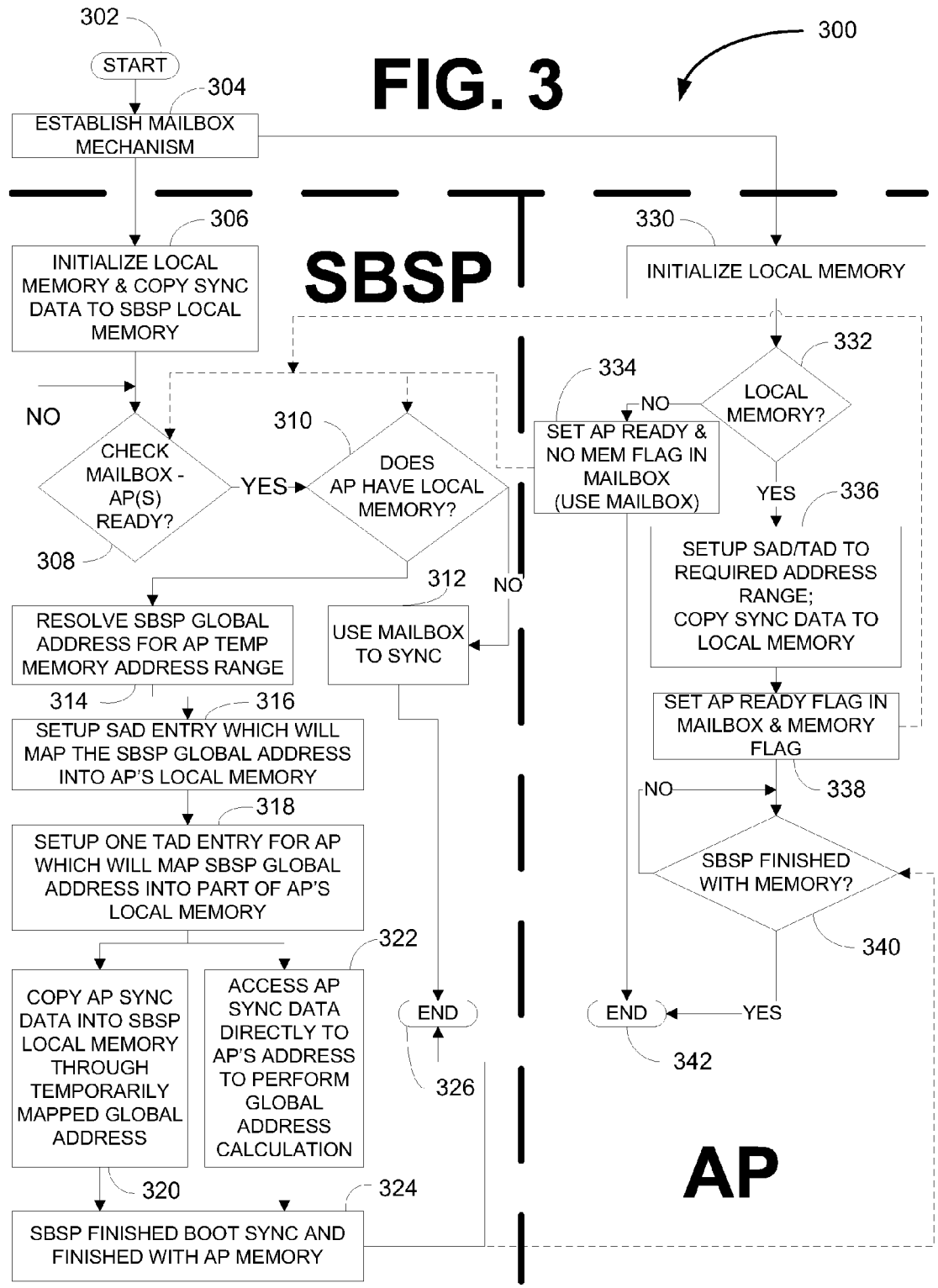

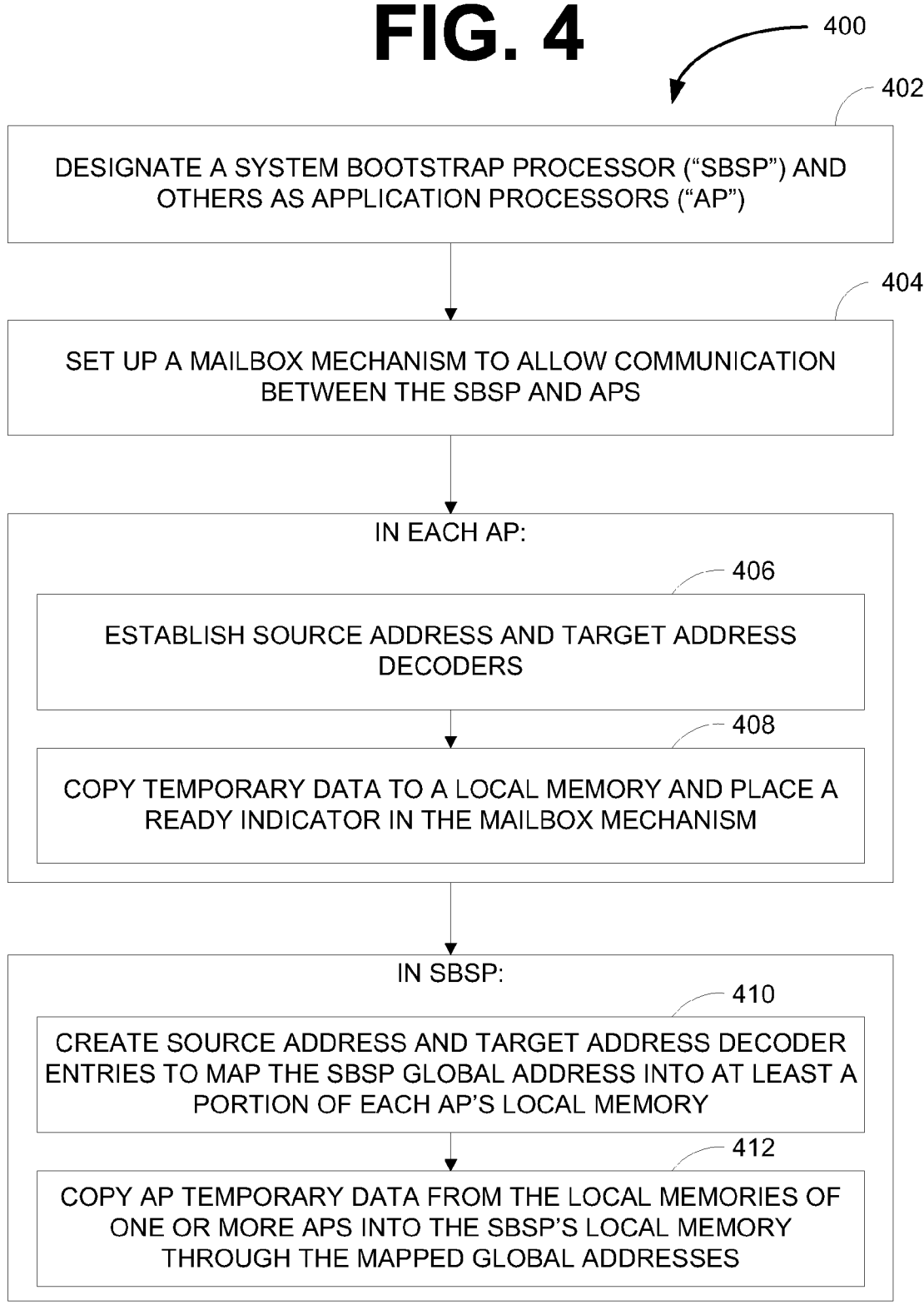

SYSTEM INFORMATION SYNCHRONIZATION IN A LINKS-BASED MULTI-PROCESSOR SYSTEM

BACKGROUND INFORMATION

Common System Interface ("CSI") systems processor include an integrated memory controller to reduce the memory access latency. Server systems may now be built using two to hundreds of such processors. In such systems, only one processor executes BIOS code to initialize memory and other portions of the system. However, as the number of processors and memory controllers has increased, the mechanisms to initialize the system and boot an operating system commonly take extended periods. As a result, initialization has been parallelized between the multiple processors.

In some CSI based multi-processor systems, all the processors execute the BIOS code in parallel and perform a Built-in Self Test ("BIST"), memory initialization, and the like to speed up the system boot time. These activities are coordinated by a System Boot Strap Processor ("SBSP") to collect the data from each of the other processors, which may be referred to as Application Processors ("AP"), and boot the operating system. Parallel initialization increases the computation requirements to initialize memory and CSI links. As a result, processor cache is configured as a temporary data store, which may be referred to as "Cache-As-RAM" or "CAR," to the processor socket in order to assist in the memory, BIST execution, and CSI initialization.

However, the temporary data store in one processor can not be accessed by other processors. In particular, the SBSP can not directly access the AP temporary stores to create global Source Address Decoder ("SAD") entries to represent the whole system. Previous efforts to allow the SBSP to create the global SAD include using a Configuration Space Register ("CSR"), a chipset or non-core register accessible by both SBSP and AP processors, as a mailbox to exchange data. However, such a mechanism involves handshaking between processors and polling of data. As the amount of data to be exchanged between the processors increases, this mechanism increases system boot latency.

BRIEF DESCRIPTION OF THE DRAWINGS

FIG. 2A illustrates data flows within portions of a system according to an example embodiment.

FIG. 2B illustrates data flows within portions of a system according to an example embodiment.

FIG. 3 is a block flow diagram of a method according to an example embodiment.

FIG. 4 is a block flow diagram of a method according to an example embodiment.

DETAILED DESCRIPTION

Figure 1:
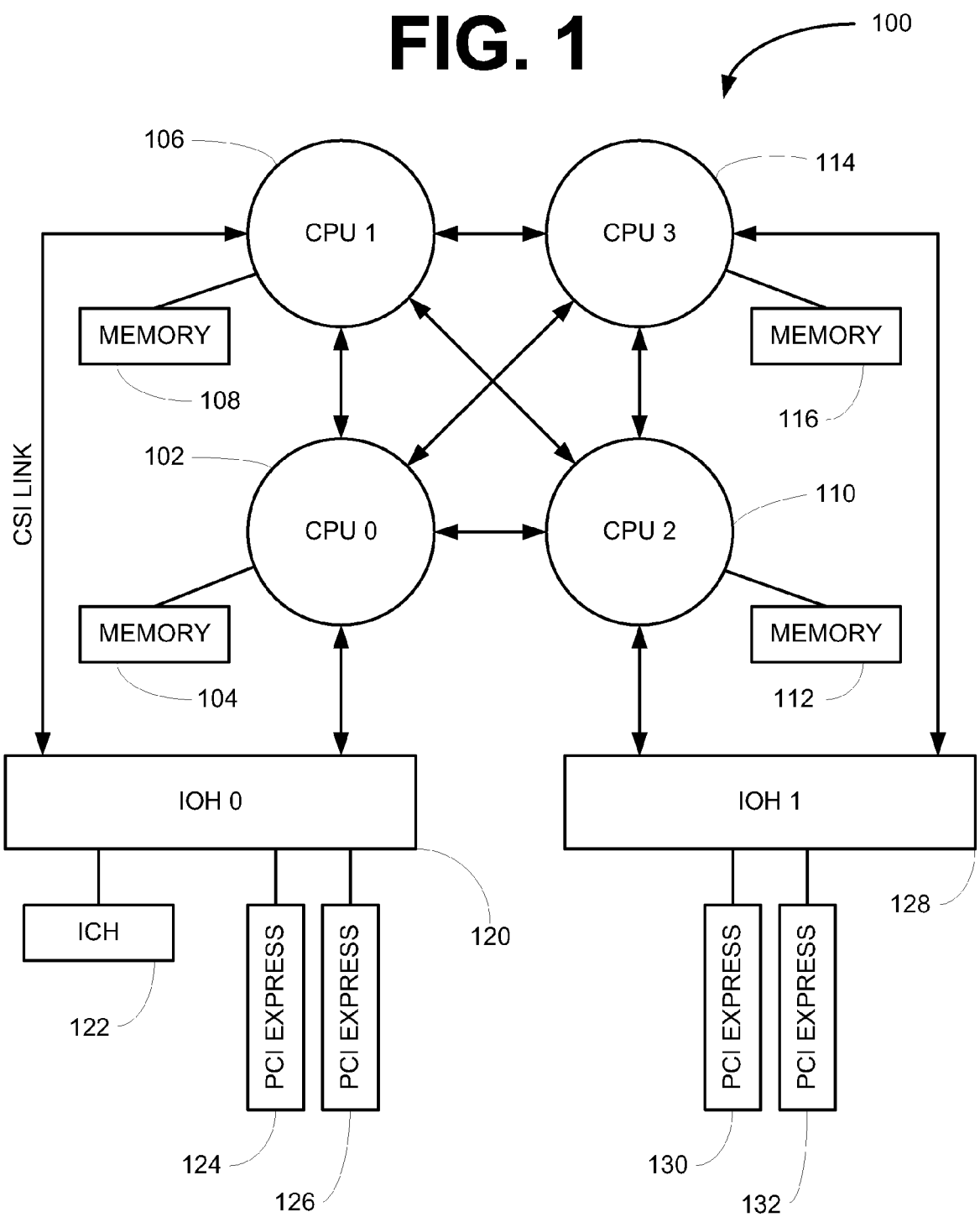
FIG. 1 is a logical block diagram of a system according to an example embodiment.

Various embodiments described herein include one or more of systems, methods, firmware, and software to synchronize system information between processors during system boot in a links-based multi-processor system. Some embodiments synchronize data block by block through memory rather than piece by piece through registers by allowing a System Bootstrap Processor ("SBSP") to directly access synchronization data in local memory of each of one or more Application Processors. These and other embodiments are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Common System Interface ("CSI") system processors include an integrated memory controller to reduce the memory access latency. Server systems may now be built using two to hundreds of such processors. In such systems, only one processor executes BIOS code to initialize memory and other portions of the system. However, as the number of processors and memory controllers has increased, the mechanisms to initialize the system and boot an operating system commonly take extended periods. As a result, initialization has been parallelized between the multiple processors.

In some CSI based multi-processor systems, all the processors execute portions of BIOS code in parallel and perform a Built-in Self Test ("BIST"), memory initialization, and the like to speed up the system boot time. These activities are coordinated by a System Boot Strap Processor ("SBSP") to collect the data from each of the other processors, which may be referred to as Application Processors ("AP"), and boot the operating system. Parallel initialization increases the computation requirements to initialize memory and CSI links. As a result, processor cache is configured as a temporary data store, which may be referred to as "Cache-As-RAM" or "CAR," to the processor socket in order to assist in the memory, BIST execution, and CSI initialization.

However, the temporary data store in one processor can not be accessed by other processors. In particular, the SBSP can not directly access the AP temporary stores to create global Source Address Decoder ("SAD") entries to represent the whole system. Previous efforts to allow the SBSP to create the global SAD include using a Configuration Spare Register ("CSR"), a chipset or non-core register accessible by both SBSP and AP processors, as a mailbox to exchange data. However, such a mechanism involves handshaking between processors and polling of data. As the amount of data to be exchanged between the processors increases, this mechanism increases system boot latency.

In various embodiments of the present subject matter, the temporary store, such as Cache-As-RAM ("CAR"), information in each socket is copied to its local memory. The SBSP temporarily sets a SAD and Target Address Decoder (TAD) entry such that the SBSP can access the memory of the remote sockets. This allows the SBSP to synchronize the remote sockets data more efficiently, perform a global address mapping, and proceed to system boot. In some embodiments, rather than using CAR, chipset or processor specific local temporary registers or memory may also be used.

FIG. 1 is a logical block diagram of a system 100 according to an example embodiment. The system 100 includes four central processing units CPU 0 102, CPU 1 106, CPU 2 110, and CPU 3 114. The central processors 102, 106, 110, 114 each include a local memory subsystem 104, 108, 112, and 116, respectively. The system 100 also includes two input/output hubs IOH 0 120 and IOH 1 128. The input/output hubs 120, 128 provide connectivity to input/output devices, such as input/output controller hub 122 and PCI Express 124, 126, 130, 132. Processor to processor and processor to input/output hub 120, 128 communication may be performed using CSI packets. Each CSI component contains a Routing Table Array ("RTA") and a SAD. The RTA provides the CSI packet routing information to other sockets. The SAD provides mechanisms to represent routing of the resources such as memory, input/output, and the like. Each CPU 102, 106, 110, 114 also contains a Target Address Decoder ("TAD"). The TAD provides mechanisms to map system addresses to processor 102, 106, 110, 114 memory 104, 108, 112, 116 addresses.

In a link-based multi-processor system, such as the system 100, after the system 100 is reset, the Basic Input/Output System ("BIOS") starts to execute from each processor 102, 106, 110, 114 in a parallel manner. Each processor 102, 106, 110, 114 performs its own power on self test ("POST") and initializes the components in its respective domain, such as local links, local memory, and attached local devices. Initialization of each processor 102, 106, 110, 114 also detects error conditions. The BIOS logs this processor 102, 106, 110, 114, which may also be referred to as a socket, information into local processor storage, such as CAR or local memory 104, 108, 112, 116 depending on the boot stage and the particular embodiment.

However, during system 100 boot, one of the processors 102, 106, 110, 114 is selected to control the whole system 100 boot. This processor is referred to as a System Bootstrap Processor ("SBSP"). The other processors 102, 106, 110, 114 are called Application Processors ("AP").

Major tasks performed by the SBSP include discovering the system 100 topology and setup of RTAs such that all components may communicate with each and synchronizes the socket-based information recorded by other processors 102, 106, 110, 114. The SBSP also performs the remaining system level initializations, such as setup of the system address map, initialization of input/output devices, and the like. The SBSP may also be tasked with loading an operating system on the system 100.

The synchronization step is important. The synchronization steps performs many functions including getting information including memory organization, DIMM size, memory size, and error information, to construct a global system 100 address map and it determines how to distribute the memory across the system 100. A common way to synchronize information before the system 100 memory addresses are setup is using a scratch register as a mailbox. The mailbox may include two scratch registers—one scratch register as command register through which the SBSP and APs may communicate command information, and the other to exchange data. If the data to be exchanged through the mailbox is not large and the commands are few, such a mechanism may be acceptable. However, as the number of commands and amount of data increases, performance becomes an issue which impacts the whole BIOS boot performance. At the same time, in order to get the data from each processor, communication must be repeated to each processor. Further, as the number of processor in the system 100 increases, the total time for collecting the data from all the processor increases.

Various embodiment herein introduce new mechanisms for the SBSP synchronization process. Some such embodiments synchronize data block by block through memory rather than piece by piece through registers. In some embodiments, each processor 102, 106, 110, 114 uses its own temporary store, such as CAR or dedicated local memory to record information during early initialization and the SBSP is provided access to the data to speed synchronization between the SBSP and APs.

For example, assume the CPU0 102 is selected as SBSP and all the other CPUs 106, 110, 114 becomes APs. All the processors 102, 106, 110, 114 and respective local memories 104, 108, 112, 116 are initialized in parallel. Each processor 102, 106, 110, 114 configures its own SAD and TAD such that the memory starts at 0, which may be some arbitrarily known location either fixed or specified by the SBSP to the APs through a mailbox mechanism of where to start in memory. The synchronization process may then cause the both the SBSP and AP processors to copy the temporary store information to their respective newly initialized local memories. Once the APs have completed their own initializations and copied the temporary data to their respective newly initialized memories, the APs may inform the SBSP that the data is ready to be consumed. The SBSP then sets up its SAD such that it is able to access each APs memory at some unique address. The SBSP may also ensure the TAD in each AP allows the access to the SAD configured by the SBSP. Once this configuration is done the SBSP can access the remote socket information in a similar manner as a memory access. As a result, access to the remote data in the memories of the APs is much faster than exchange of data solely through the mailbox mechanism.

Both FIG. 2A and FIG. 2B illustrate data flows within portions of a system according to an example embodiment. The illustrations of FIG. 2A and 2B assume that both CPU 0 202 and CPU 1 (not illustrated) have already been initialized and data during initialization has been copied to a memory location of each CPU memory as specified by the SBSP through the mailbox mechanism as described above.

In the example embodiment of FIG. 2A and FIG. 2B, the system includes a CPU 0 202 having a memory 216 and a CPU 1 (not illustrated) having a memory 218. During the synchronization process of the system boot, CPU 0 202 is the SBSP and CPU 1 is an AP. CPU 0 202 holds a SAD 204 with mappings to logged data in both the CPU 0 202 memory 216 and CPU 1 memory 218.

The SAD 204 includes a portion 206 of mappings to data including data logged during initialization of the CPU 0 202, such as mapping 210 to data Y 214 stored in CPU 0 202 memory 216. The SAD 204 also includes a portion 208 of mappings to data logged during initialization of the CPU 1, such as mapping 212 to data X 214 stored in CPU 1 memory 218. CPU 0 202 may then use the SAD 204 mapping 212 to data X 220 in CPU 1 memory 218 to directly read, or otherwise access, data X 220 to copy the data to the CPU 0 202 memory. Data X 224, which is a copy of data X 220 from CPU 1 memory 218, may then be stored in CPU 0 202 memory 216. Once stored to the CPU 0 202 memory, a mapping 222 is placed in the portion 206 of mappings to data logged during initialization of the CPU 0. As a result, further processing that may need to be performed by CPU 0 202 as it executes as the SBSP may be performed more quickly. In some other embodiments, CPU 0 202 may alternatively access the data in CPU 1 memory 218 as needed rather than copying the data. This still results in faster synchronization operations by the SBSP because data may be read from the remote memory block-by-block rather than register-by-register as in previous solutions.

FIG. 3 is a block flow diagram of a method 300 according to an example embodiment. The example method 300 is method of synchronization between an SBSP and one or more APs during boot of a computing system, such as system 100 of FIG. 1.

The example method 300 starts at 302 and establishes a mailbox mechanism 304 in a location that may be accessible by both the SBSP and the one or more APs. From this point, the method 300 branches and operates in a parallel mode with synchronization at at least one point between an SBSP branch and one or more individual AP branches.

The SBSP branch on the left hand side of FIG. 3 is performed by a processor designated as the SBSP. The SBSP branch of the method 300 includes initializing a local memory and copying synchronization data to the local memory 306. In some embodiments, the SBSP branch then checks a mailbox mechanism to determine if the one or more APs are ready 308, meaning that the APs have each been initialized and synchronization data generated as logged data during AP initialization has been copied to the local memory of each respective AP. However, in other embodiments, the check of the mailbox to see if the one or more APs are ready 308 includes individually checking each AP if it is ready and proceeding with the SBSP portion of the method 300 for each individual AP. More detail of the AP portion of the method 300 is given below.

If the AP(s) are not ready, the mailbox is checked 308 again in an iterative fashion, such as at measured intervals, until the AP(s) are either ready, or in some embodiments, the checking 308 times out and an error handling process of the BIOS is triggered. The BIOS error handling process, in some embodiments, may cause an AP causing such an error to be offlined and the system is allowed to boot, sans the malfunctioning AP.

In some embodiments, the SBSP portion of the method 300 then determines if the APs have local memories 310 copied synchronization data generated as logged data during AP initialization. This determination may be made for the APs as a whole or individually. If the APs are handled individually, the method 300 may proceed for each AP individually. In such embodiments, if an individual AP does not have a such a memory, the method 300 fails out through the command at 312 and instructs the SBSP to utilize mailbox synchronization with that particular AP. Otherwise, the determination may be made for the APs as a whole. If one AP does not have such a memory, the method 300 fails out through the command at 312 to use the mailbox synchronization and the method ends 326.

However, if each AP or all APs, depending on the embodiment, include a memory holding the synchronization data, the method 300 includes resolving an SBSP global address for an AP temporary memory address range 314. This resolving 314 may include sending a message to each AP of an address range in the local memories of respective APs to reserve and utilize to copy synchronization data to that later may be directly accessed by the SBSP.

The SBSP portion of the method 300 proceeds to setup SAD entries which will map the SBSP global address space in the one or more AP local memories. The SAD entries for APs may be setup as a function of the address ranges communicated to respective APs via the mailbox mechanism. Further, the method sets one TAD entry for each AP which will map the SBSP global address space into at least a portion of each APs local memory 318.

Once the mappings 316 and 318 are completed, the SBSP may access data within the memories of the APs. This access may be performed in several ways, two of which are included in the method 300. The method 300 may copy AP synchronization data into SBSP local memory through the temporarily mapped global address space 320. Alternatively, the method 300 may access AP synchronization data directly to an AP's address with the AP performing the global address calculation 322. In either case 320, 322, the SBSP has synchronized the AP synchronization data and is finished with AP the memories 324. The SBSP at this point communicates with each AP for which the SBSP has finished memory operations, such as through the mailbox mechanism. In some embodiments, the SBSP-AP communication is performed on an AP by AP basis. In other embodiments, a single, global communication is made by the SBSP to all of the one or more APs informing the APs that the SBSP is finished with the remote memory operations. The SBSP portion of the method 300 then ends 326.

Turning now to the AP portion of the method 300, each AP individually performs this portion of the method 300. The AP portion of the method 300 includes initializing local memory 330 and checking to see if the AP has local memory 332. If there is no local memory, the method 300 sets an AP ready flag to true and a memory flag to "NO" 334. These flags may be set in the mailbox mechanism or communicated via a message, such as across CSI link or other mechanism to the SBSP. The AP ready flag and memory flag are consumed by the SBSP portion of the method 300 at the check to see if the AP is ready 308 and the check if the AP has a local memory 310. Following the setting of the flags 334, the AP portion of the method 300 ends 342.

However, if it is determined 332 that the AP does have a local memory, the AP portion of the method 300 includes setting up one or both of a SAD and a TAD in a required address range and copying synchronization generated as logged data during initialization of the AP to the local memory 336. The required address range, in some embodiments, is supplied by the SBSP portion of the method 300. The required address range in such embodiments may be generated by the resolving of the SBSP global address space 314 and communicated to the AP via the mailbox mechanism. In other embodiments, an AP may have a default address range of where to copy the synchronization data 336.

Once the setup and copying 336 is complete, a ready flag for the AP is set to true and a memory flag to "YES" 338. These flags may be set in the mailbox mechanism or communicated via a message, such as across CSI link or other mechanism to the SBSP. As mentioned above, the AP ready flag and memory flag are consumed by the SBSP portion of the method 300 at the check to see if the AP is ready 308 and the check if the AP has a local memory 310.

The AP portion of the method then holds the data is the local memory at least until it is determined that the SBSP has finished consuming the synchronization data 340. At that point, the synchronization data may be held or destroyed, depending on the embodiment, and the AP portion of the method 300 ends 342.

The method 300, in various embodiments, includes one or more synchronization points. For example, the check if the AP(s) are ready 308 and the check if the APs have local memory 310 both force a synchronization of the SBSP and AP portions of the method 300. Both checks in the SBSP portion of the method 300 are dependent on communicated data received from the AP portion of the method 300. Further, the check if the SBSP is finished with the AP memory 340 in the AP portion of the method 300 waits for the SBSP to finish its data operations on the AP local memories before the AP portion of the method 300 may end. Other and alternative points of synchronization may be included in other embodiments depending on the computing environment and requirements of the specific embodiment.

FIG. 4 is a block flow diagram of a method 400 according to an example embodiment. The example method 400 is a method of initializing a multi-processor system including two or more processors. The example method 400 includes designating a processor as an SBSP and other processors as APs 402. The method 400 further includes setting up a mailbox mechanism to allow communication between the SBSP and APs 404. However, other embodiments may utilize another or an additional communication mechanism, such as one or more mechanisms that may be available in a CSI environment.

In each AP of a multi-processor system upon which the method 400 is implemented, the method 400 includes establishing source address and target address decoders 406 and copying temporary data to a local memory and placing a ready indicator in the mailbox mechanism 408 or communicating using another messaging mechanism. In each SBSP of the multi-processor system upon which the method 400 is implemented, the method 400 further includes creating source address and target address decoder entries to map the SBSP global address into at least a portion of each AP's local memory 410 and copying AP temporary data from the local memories of one or more APs into the SBSP's local memory through the mapped global addresses 412.

In some embodiments, the SBSP may, after copying the AP temporary data 412, inform the APs the copying 412 is complete. In some such embodiments, the SBSP, after the copying 412 is completed from all of the APs, may further inform each AP that the copying is complete. The copying of AP temporary data from the local memories of one or more AP's into the SBSP's local memory through the mapped global addresses 412 may include the SBSP accessing the AP data directly.

In some embodiments, the method 400 may be encoded in an instruction set, which when executed by a system, causes the system to perform the method 400. The instruction set may be encoded on a computer readable medium, such as a tangible and/or physical computer readable medium. The computer readable medium may be a volatile or non-volatile memory within a computing device, a magnetic or optical removable disk, a hard disk, or other suitable local, remote, or removable data storage mechanism or device.

Some embodiments may also provide a system including two or more processing units each including a local memory. Such systems may also include a synchronization module operable during system boot to designate one of the two or more processing units as an SBSP and the other processors of the two or more processing units as APs. The synchronization module may be further operable to initialize the SBSP and APs and their respective local memories, to instruct the APs to copy synchronization data generated during initialization to memory and inform the SBSP that the data is ready. The synchronization module may then create, in the SBSP, source address and target address decoder entries to map the SBSP global address to each AP's local memory and copy, by the SBSP, the AP synchronization data into the SBSP's local memory. In some embodiments, at least one of the two or more processing units include a core of a multi-core processor. Initialization of an AP may include initialization of one or more devices attached thereto. The synchronization module may be operable on the SBSP. In other embodiments, the synchronization module may be operable in whole or part on an AP or a microprocessor embedded in another portion of the system, such as a microprocessor within an input/output controller hub ("ICH").

As described herein, reference is made to the number of processors included in a system in a number of ways. In various embodiments, the number of processors is two or more, three or more, four or more, or any other number of processors greater than two. One or more of these processors may be a multi-core processor. The processors in some embodiments are all identical processors. However, in other embodiments, the processors may be of varied types.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method of initializing a multi-processor system, the method comprising:
   designating a system bootstrap processor ("SBSP") and others as application processors ("AP");
   setting up a mailbox mechanism to allow communication between the SBSP and APs;
   in each AP:
      establishing source address and target address decoders; and
      copying temporary data to a local memory and placing a ready indicator in the mailbox mechanism; and
   in the SBSP:
      creating source address and target address decoder entries to map the SBSP global address into at least a portion of each AP's local memory; and
      copying AP temporary data from the local memories of one or more APs into the SBSP's local memory through the mapped global addresses.

2. The method of claim 1, wherein the SBSP, after copying the AP temporary data, informs the APs the copying is complete.

3. The method of claim 2, wherein the SBSP, after the copying is completed from all of the APs, informs each AP that the copying is complete.

4. The method of claim 1, wherein copying AP temporary data from the local memories of one or more AP's into the SBSP's local memory through the mapped global addresses includes accessing the AP data directly.

5. The method of claim 1, wherein the mailbox mechanism is an accessible data storage location accessible by the SBSP and the APs.

6. The method of claim 1, wherein the AP temporary data includes data needed by the SBSP to synchronize startup of the multi-processor system.

7. The method of claim 1, wherein the SBSP causes an operating system to be loaded within the computing environment of the multi-processor system.

8. The method of claim 1, wherein the mailbox mechanism includes two registers, a first register to exchange commands between the SBSP and the APs and a second register to exchange data from the APs to the SBSP.

9. A computer-readable medium, with instructions thereon, which when executed by a computing device, cause the computing device to perform the method of claim 1.

10. A system comprising:
    two or more processing units, each processing unit including a local memory;
    a synchronization module operable during system boot to:
        designate one of the two or more processing units as a system bootstrap processor ("SBSP") and the other of the two or more processing units as application processors ("AP");
        initialize the SBSP and APs and their respective local memories;
        instruct the APs to copy synchronization data generated during initialization to memory and inform the SBSP that the data is ready;
        create, in the SBSP, source address and target address decoder entries to map the SBSP global address to each AP's local memory; and
    copy, by the SBSP, the AP synchronization data into the SBSP's local memory.

11. The system of claim 10, wherein the two or more processing units include a core of a multi-core processor.

12. The system of claim 10, wherein the AP synchronization data includes data needed by the SBSP to synchronize startup of the system.

13. The system of claim 10, wherein initialization of an AP includes initialization of any devices attached thereto.

14. The system of claim 10, wherein the synchronization module is operable on the SBSP.

15. The system of claim 10, wherein
    the two or more processing units includes three or more processing units, two or more of which are designated as APs.

* * * * *